*L. Ranson,*

Trunk.

No. 67,905.  Patented Aug. 20, 1867.

Witnesses
Jas. L. Coombs
J. C. Winn

Inventor
Louis Ranson,
By J. L. Coombs
Attorney

United States Patent Office.

LOUIS RANSOM, OF LANSINGBURG, NEW YORK.

Letters Patent No. 67,905, dated August 20, 1867.

---

IMPROVED TRAVELLING-TRUNK.

---

The Schedule referred to in these Letters Patent and making part of the same.

---

TO ALL WHOM IT MAY CONCERN:

Be it known that I, LOUIS RANSOM, of Lansingburg, in the county of Rensselaer, and State of New York, have invented a new and useful Improvement in Travelling-Trunks; and I do hereby declare that the following is a full, clear, and exact description thereof, reference being had to the accompanying drawings, and to the letters of reference marked thereon.

Travelling-trunks, as ordinarily constructed, are liable to be soon knocked to pieces by the ordinary handling of travel, because their general form being cubical, their sides and angles are exposed to numerous severe blows which reach the unavoidably weak joints; and although strengthened by iron stays, they soon give way. To correct this weakness in trunks, I propose making them in the form of cylinders, the staves of which they are made being bound together by two or more strong, thick hoops, banded with iron, which will serve the purpose of wheels, and enable a child to roll a heavy trunk over any ordinarily level plane. Being made in a cylindrical form, the trunk is much more capable of resisting blows and hard usage than a square one; while, being rolled from one point to another, it will be less exposed to them. In the accompanying drawings—

Figure 1:
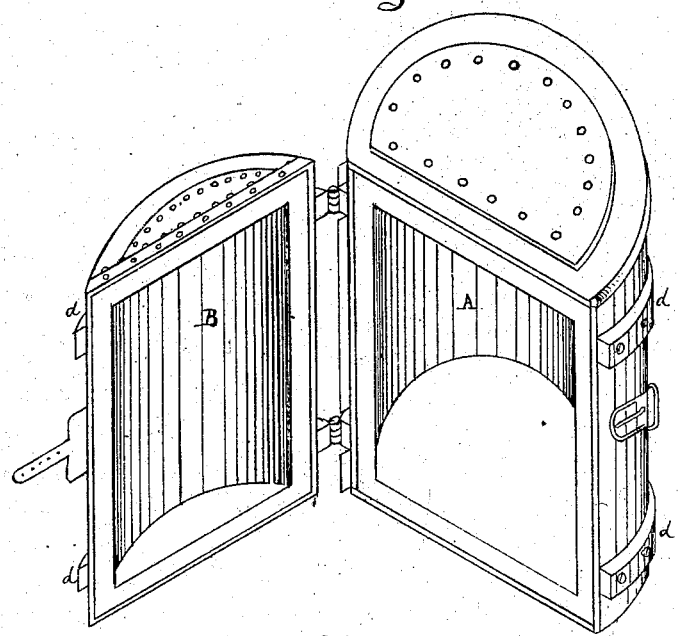
Figure 2:
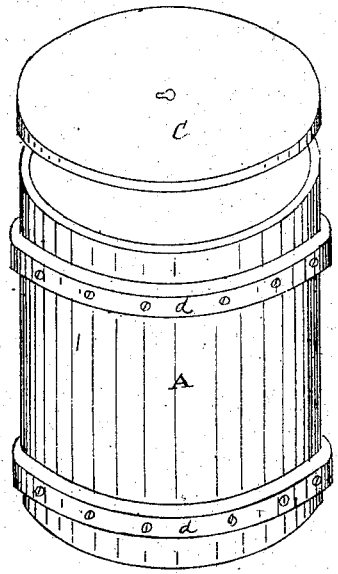

Figure 1 is a perspective view of my cylindrical trunk, with a side lid thrown open, and Figure 2 shows another modification of my invention, the trunk having no side lid or opening, but having one end or head removable.

A is the cylindrical body of the trunk; B, fig. 1, is the side lid, thrown open; C, fig. 2, is the removable head; and d d are the raised hoops or bands, which hold the trunk together, and serve as wheels on which it rolls. A trunk constructed to open at the end, as shown in fig. 2, will manifestly be the stronger, as the hoops will be continuous around its circumference. The opening head may be made entirely removable, with a lock and key-hole in the centre, with a number of bolts to shoot out radially in different directions into the body of the trunk; or said head may be hinged to the body of the trunk on one side, and may be provided with any suitable lock. The hoops d d should be sufficiently raised above the surface of the cylindrical body of the trunk to protect the latter from coming in contact with the ground or pavement, though the surface over which the trunk is rolled should be somewhat rough or uneven.

What I claim as my invention, and desire to secure by Letters Patent, is—

1. A travelling-trunk, which, when closed, as in fig. 1 of the drawings, shall have the form of a cylinder.

2. In combination with a cylindrical travelling-trunk, I claim two or more raised hoops or bands around the circumference thereof, to serve as wheels upon which the trunk may be rolled, while they protect the body of it from contact with the ground.

LOUIS RANSOM.

Witnesses:
 W. BRADSHAW,
 EUGENE HYATT.